(12) United States Patent
Perkins

(10) Patent No.: US 11,627,242 B2
(45) Date of Patent: Apr. 11, 2023

(54) SELF-CONTAINED BIRD FEEDER WITH CAMERA AND STREAMING VIDEO

(71) Applicant: Frederick Perkins, McLean, VA (US)

(72) Inventor: Frederick Perkins, McLean, VA (US)

( * ) Notice: Subject to any disclaimer, the term of this patent is extended or adjusted under 35 U.S.C. 154(b) by 969 days.

(21) Appl. No.: 14/735,282

(22) Filed: Jun. 10, 2015

(65) Prior Publication Data

US 2016/0366319 A1 Dec. 15, 2016

(51) Int. Cl.
*H04N 5/232* (2006.01)
*A01K 39/01* (2006.01)
*H04N 5/225* (2006.01)
*H04N 1/00* (2006.01)

(52) U.S. Cl.
CPC ............ *H04N 5/2257* (2013.01); *A01K 39/01* (2013.01); *H04N 1/00209* (2013.01); *H04N 1/00244* (2013.01); *H04N 5/23203* (2013.01)

(58) Field of Classification Search
CPC ............. H04N 5/2257; H04N 5/23203; H04N 1/00209; A01K 39/01
See application file for complete search history.

(56) References Cited

U.S. PATENT DOCUMENTS

| 9,137,974 | B2 * | 9/2015 | Boehm | A01K 5/0291 |
| 9,247,719 | B1 * | 2/2016 | Bennett | A01K 39/0206 |
| 2012/0233649 | A1 * | 9/2012 | Seigler | A01K 5/02 725/109 |
| 2014/0355446 | A1 * | 12/2014 | Altman | H04W 28/0289 370/235 |
| 2015/0373945 | A1 * | 12/2015 | Sung | A01K 5/0283 119/51.5 |
| 2016/0156989 | A1 * | 6/2016 | Lovett | H04N 7/183 348/143 |

* cited by examiner

*Primary Examiner* — Tsion B Owens
(74) *Attorney, Agent, or Firm* — Myers Bradford, PLLC

(57) ABSTRACT

A system and method are described for providing improved bird feeders, especially self-contained bird feeders capable of providing streaming video. The system and method employ a novel design offering a streaming video from a self-contained feeding platform, described in the drawings and the detailed description.

6 Claims, 5 Drawing Sheets

SELF-CONTAINED BIRD FEEDER WITH CAMERA AND STREAMING VIDEO

CROSS REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

INCORPORATION BY REFERENCE OF ELECTRONIC MEDIA

Not Applicable

STATEMENT REGARDING PRIOR DISCLOSURES

Not Applicable

BACKGROUND OF THE INVENTION

Field of the Invention

A system and method are described for providing improved bird feeders, especially self-contained bird feeders capable of providing streaming video. The system and method employ a novel design offering a streaming video from a self-contained feeding platform, described in the drawings and the detailed description below.

BRIEF SUMMARY OF THE INVENTION

The present invention is a bird feeder with built in camera, computer controller, and Internet connection. The invention enables a user at a remote computer to control the computer over the Internet or over the local network hosting the bird feeder, to take still pictures of feeding birds or other animals, to take videos of feeding birds, to transmit pictures or videos over the Internet to remote computers, and to transmit "live" streaming video over the Internet to remote computers. The invention is described in further detail in the drawings and the detailed description below.

DETAILED DESCRIPTION OF THE INVENTION

The present invention offers improved viewing and of birds at a feeder. In particular, the present invention incorporates a camera and electronics to provide a streaming video feed, including a power source and a controller. As a result, the present invention offers a self-contained platform for providing streaming video that may be broadcast over the Internet. The mobility, versatility, and economy of the present invention offer a substantial improvement in its field.

Figure 1:
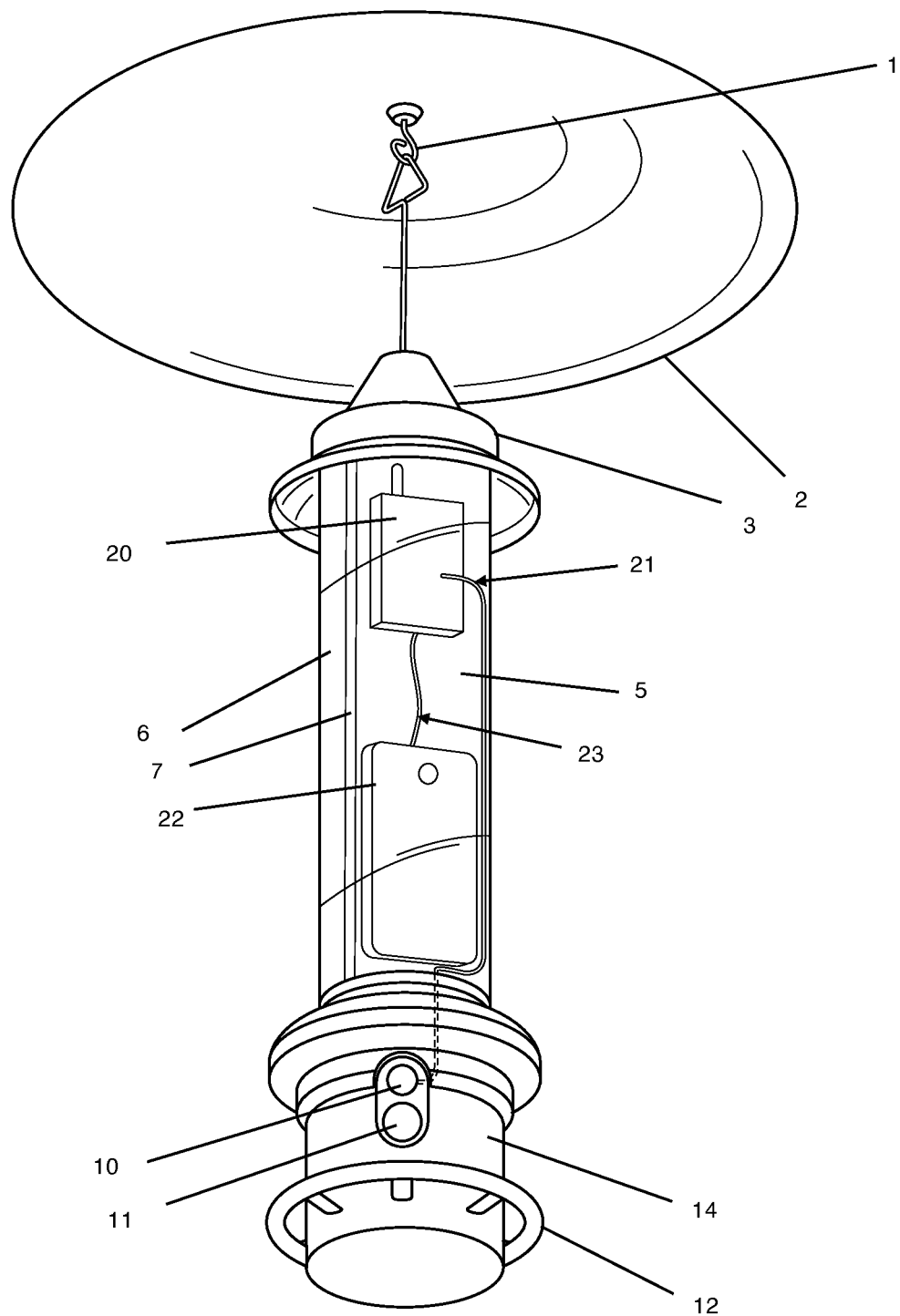
FIG. 1 is a perspective view of the self-contained bird feeder of the present invention.

A representative feeder of the present invention is illustrated in FIG. 1. This view of a feeder of the present invention shows a feeder as assembled and in use. Toward the top of the feeder, a shield 2 may be used to protect against squirrels or other unwanted animals. The shield 2 may have a hook 1 that may attach to the feeder top 3. Below the feeder top 3 is the feeder housing 5.

The feeder housing 5 may contain many of the functional components of the present invention, including a computer 20, preferably with a WiFi adapter or WiFi dongle, an internal power source such as a battery 22, a feed compartment 6 and a feed compartment separator 7. A power connector wire 23 connects the computer 20 to the battery 22. A camera cable 21 may connect a camera 10 to the computer 20. The feeder housing may be opaque or clear, and in a preferred embodiment is clear to enable visual inspection of the level of bird feed in the feeder compartment 6.

In an alternative embodiment of the invention, the power source, battery 22, may be augmented by or replaced with one or more other internal power sources, for example solar energy panels. In a preferred embodiment, a solar energy panel can provide sufficient power to operate the computer and camera. For example, one or more solar panels may be mounted on the shield 2 or a canopy. It is also contemplated under the present invention to arrange a solar power source such that it recharges a battery 22. Thus, the present invention may include a combination of solar power and a battery to ensure smooth computer start-up, operation, and shutdown.

Feed may be fed by gravity from the feeder compartment 6 through the feeder housing 5 to the feeder bottom 14, and to a feed port 11 located on the feeder bottom 14. A camera 10 may be aligned with the feed port 11. In this way, a bird may land on a perch 12 located just below the feed port 11, in accessing feed, and be filmed by the camera 10, located near the feed port. In an alternate embodiment, a sensor may be mounted near the camera to activate the camera when a bird is in range of the camera. Examples of suitable sensors include motion detectors and infrared sensors.

Figure 2:
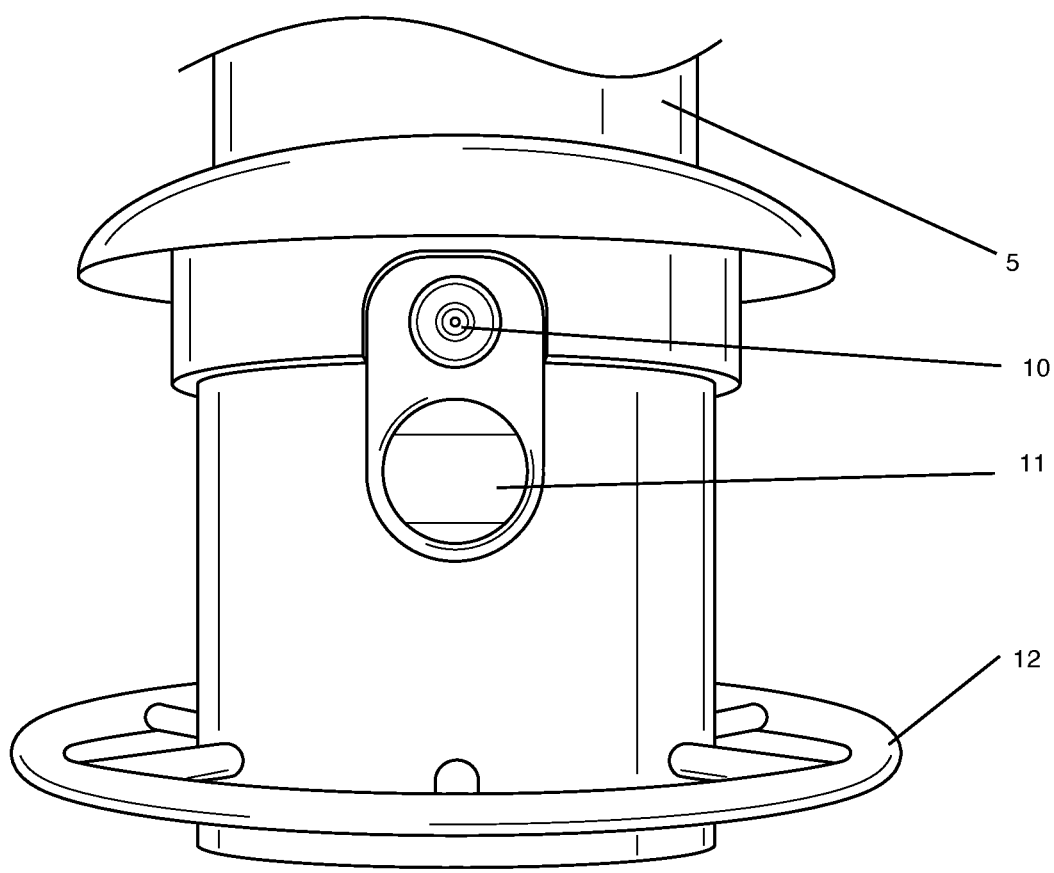
FIG. 2 is a front view of the perch and viewing port of the self-contained bird feeder of the present invention.

The arrangement of the feeder bottom 14 is illustrated in greater detail in FIG. 2. The feeder bottom 14 may be a separate component of the bird feeder that attaches to the feeder housing 5, or the feeder bottom 14 may be a section of the feeder housing 5 itself, for example a section of the feeder housing located at an end of the feeder housing 5.

While a preferred embodiment of the present invention contemplates a feeder specifically for birds, it is within the invention to apply the same elements of the invention to other feeders.

An opening may be machined in the feeder bottom 14 to allow the camera 10 to be mounted in close proximity to the feed port 11, preferably just above the feed port 11. One of ordinary skill in the art will appreciate the various arrangements of the perch 12, feed port 11, and camera 10 such that the spacing is optimized to correspond to video of certain angles of birds, or to birds of a certain size range. Various shields, barriers, and other features may be used near the feeder bottom 14 both to protect the feed port and offer improved filming by the camera 10.

Figure 3:
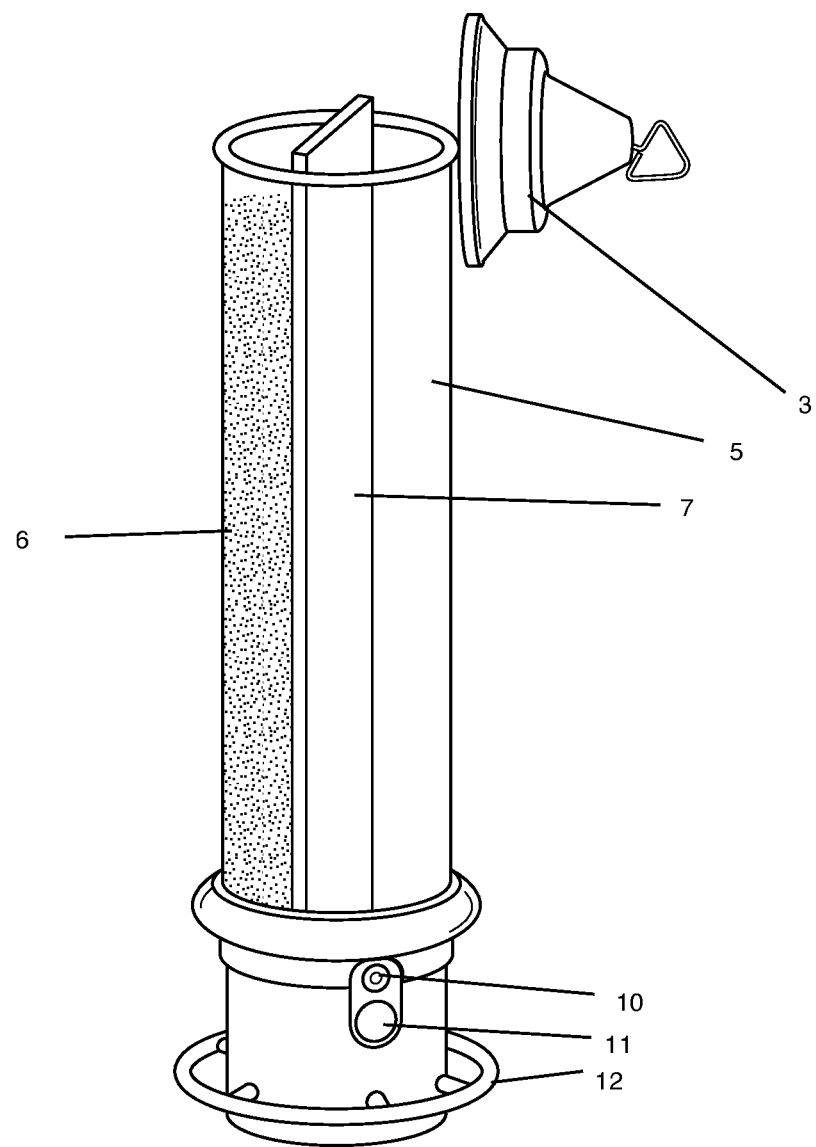
FIG. 3 is a perspective view of the feeder portion of the self-contained bird feeder of the present invention.

As shown in FIG. 3, the bird feeder of the present invention may have a feed compartment 6 located in the feeder housing 5. The feeder top 3 may be removed to allow filling the feed compartment 6 with feed or accessing electronic or other components as needed. A feed compartment separator 7 may be employed to physically separate the feed from an open space in the feeder housing that may be used for various components, especially the electronic components of the present invention, such as a power supply, a computer, and electronics to implement an Internet connection. The feed compartment separator 7 may be any suitable material, such as foamboard, wood, plexiglass, etc. and placed in the feeder housing 5 in a suitable fashion such that feed is kept apart from the electronic components.

Figure 4:
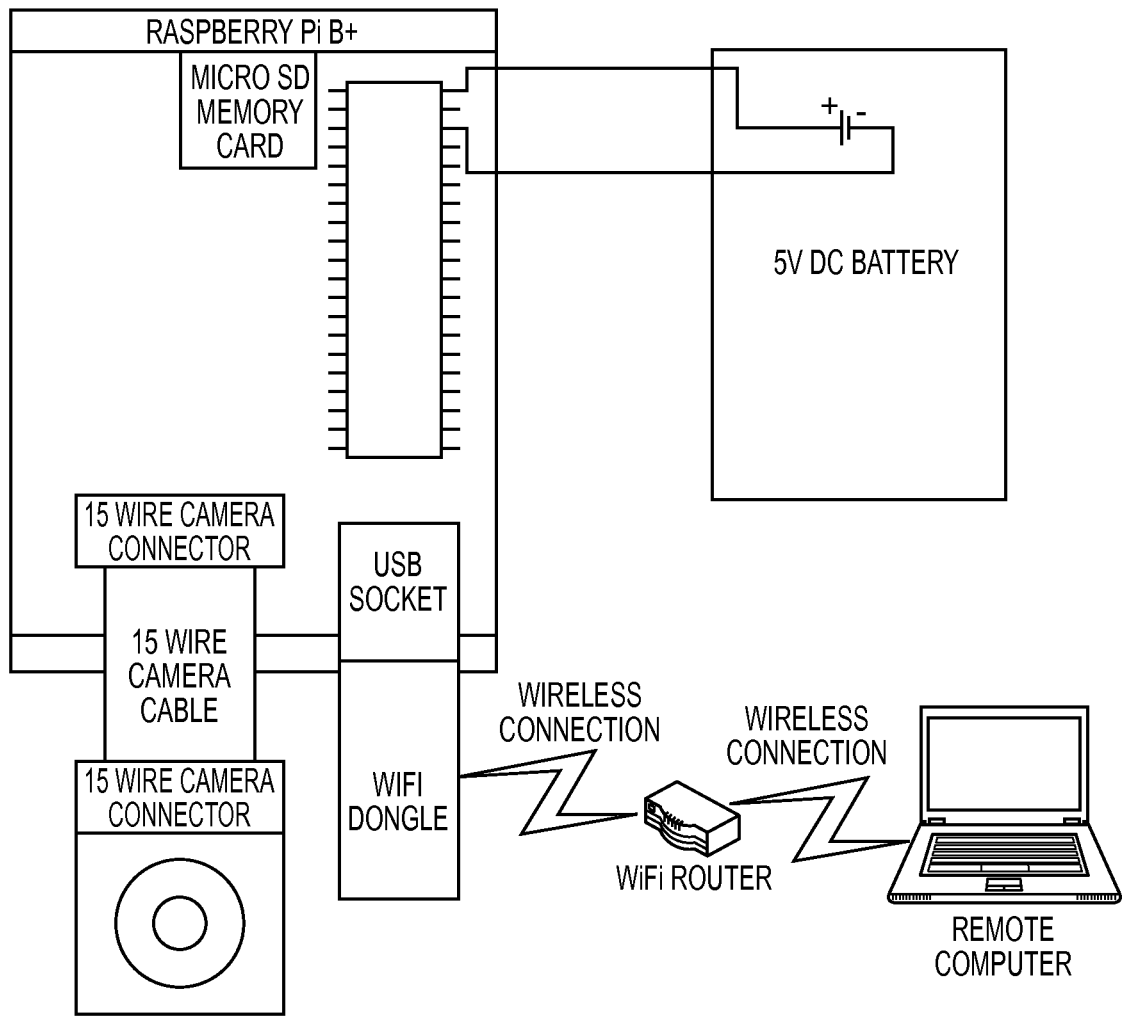
FIG. 4 is a block diagram of the self-contained bird feeder of the present invention.

The feeder and method of the present invention are further illustrated in a block diagram of electronic components in FIG. 4. The invention includes:

A Camera that is mounted to the bird feeder and is aligned with a feeding station to allow photographic observation of feeding birds;

A programmable computer controller that is mounted to the bird feeder (e.g., Raspberry Pi B+);

A means of providing electrical power, electrical controls, and means of retrieving photographic images from the camera controlled by the computer controller (e.g., 15 wire camera cable);

Computer software that runs the computer controller and controls camera functions and data retrieval, including video and still images (e.g., software included in Raspbian Linux distribution);

An Internet connection (e.g. Ethernet connection to WiFi router) for the computer controller;

Internet connection hardware (e.g., WiFi transmitter and receiver, WiFi adapter, or WiFi dongle) attached to the computer controller;

Software running on the computer controller to manage and maintain the Internet connection (e.g., included in Raspbian Linux distribution);

Multimode camera capability via programmable computer controller that enables still photography, video capture, and/or live streaming video;

Software that enables the computer controller to act as server for streaming video over the Internet (e.g., VLC) via connection to router;

Software that enables the computer controller to act as a server for interactive control from remote computer over the Internet (e.g., unix/Linux server SSH);

Software that enables monitoring of streaming video from the computer controller from remote computers (e.g., VLC);

Electrical power to run the computer controller (e.g., 5 VDC from battery), and

Autonomous operation capability without connection to external power supply or wired connection.

Thus, a method may be provided under the present invention for transmitting images from a bird feeder, or other feeder comprising: equipping a feeder housing with a camera in close proximity to a feed port; providing a source of electrical power for a computer disposed within the bird feeder; configuring a computer disposed in the bird feeder to control the camera; operating the camera to capture images; and transmitting images to a WiFi network.

Figure 5:
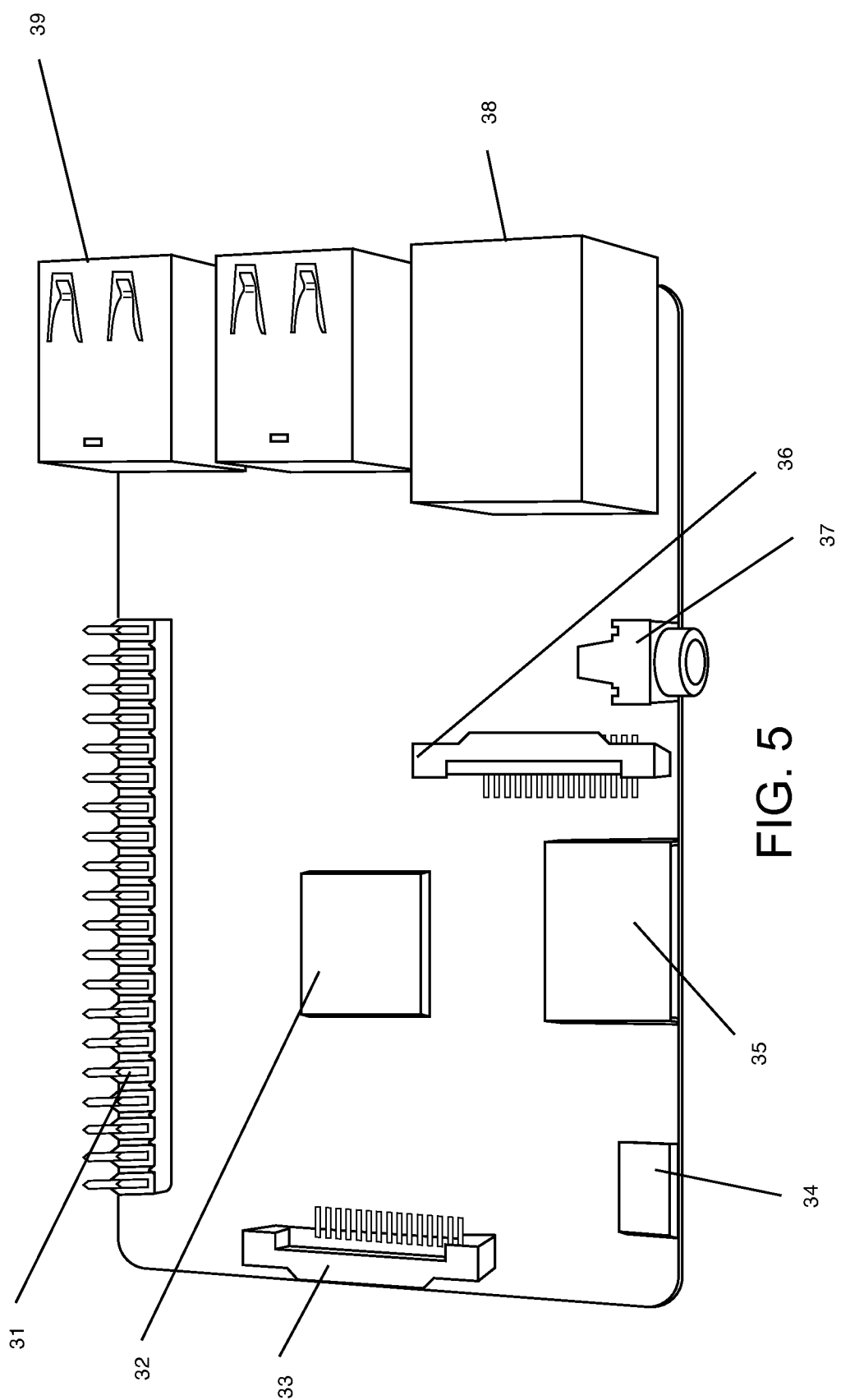
FIG. 5 is a perspective view of the circuit board as appearing in the bird feeder of the present invention.

A computer controller that may be employed in the present invention is illustrated in FIG. 5. A processor 32, for example a Broadcom BCM 2835 with 512 MB RAM, is mounted on a circuit board; and a header 31, for example a 40 pin GPIO header, is located at the top of the circuit board. A display connector 33 may be mounted on the circuit board. A 5V micro USB socket 34 is shown located on the lower left corner of the circuit board. A multi-media interface 35, for example a HDMI port, is situated next to camera connector 36, and audio/video jack 37, in this case a 4-pole 3.5 mm stereo audio and composite video jack. An ethernet socket 38 provides access to an internet connection. One or more USB ports 39 may be mounted on the circuit board in a preferred embodiment of the invention.

A battery 22 is connected to the Raspberry Pi to provide 5 VDC electrical power. Both the battery and the Raspberry Pi subassembly may be mounted via Velcro to an aluminum alloy strip that allows insertion and removal from the bird feeder.

Example 1 below provides additional details of a preferred embodiment of the present invention.

Example 1

In a preferred embodiment of the invention, a Squirrel Buster Plus bird feeder from Brome Bird care, 331 Knowlton Road, Knowlton, Quebec is converted into the present invention. A viewing port is machined into the bird feeder. The viewing port is aligned with the feed port to provide an optical path from an internally mounted camera to the area in front of the feed port. A digital camera is mounted in the bird feeder. The camera is aligned with the viewing port so that it can observe feeding birds. In this example, the camera was manufactured by Nanjing Paichi. The camera is mounted on a printed circuit board that includes a 15 wire ribbon cable terminal. The camera is attached to the feeder by four bolts that extend from the feeder shell to beyond the back surface of the camera board. There may be nylon spacers between the feeder shell and the camera board to provide proper mounting distance. There is a protective shield placed over that back of the camera board to protect the electrical contacts. There are four nuts, one for each bolt, attached to the bolts such that they secure both the protective shield to the back of the camera board and secure the camera to feeder shell.

The camera is connected to a Raspberry Pi B+ computer by a 1 meter long 15 wire ribbon cable that is connected to the terminal on the camera board and to the Raspberry Pi. The Raspberry Pi is mounted in a plastic case. The Raspberry Pi includes at least one USB port. A WiFi adapter (dongle) is connected to a USB port. A battery is connected to the Raspberry Pi to provide 5 VDC electrical power. The battery and the Raspberry Pi subassembly are mounted via Velcro to an aluminum alloy strip that allows insertion and removal from the bird feeder. A foamboard strip separates the electronics from the feed reservoir.

The Raspbian Linux distribution (available from http://www.raspberrypi.org/downloads/) containing the software that runs the Raspberry Pi, that enables camera support, manages Ethernet and internet connectivity, secure shell server (SSH), and enables other essential functions was installed on an 8 GB micro SD memory board that was then loaded into the Raspberry Pi and run. Camera support and SSH were enabled for the Raspberry Pi during setup. Using software included in the Raspbian distribution and a WiFi dongle inserted into a USB socket, WiFi connection was enabled and a WiFi router selected. This enables feeder communication with the Internet for remote feeder control and producing streaming video. VLC server software was also loaded onto the Micro SD card to enable streaming video by executing the command "sudo apt-get install vlc" (see for example http://www.videolan.org/doc/vlc-user-guide/en/ch01.html).

After configuration as described above, the Raspberry Pi and battery were connected to an aluminum strip and inserted into the bird feeder. The foamboard strip was inserted into the reservoir to separate the feed from the electronics.

The feeder was then hung from a tree outside and within range of connection to a WiFi router.

Logging into the feeder's Raspberry Pi enabled SSH server provides remote control over all computer functions, including the camera. Software that provides remote control of the Raspberry Pi and the connected camera may be written in Python and stored on the Micro SD memory card, or commands executed over the SSH connection.

Python support is included in the Raspbian distribution. Using SSH and executing the desired program allows on-demand capture of still pictures and/or videos using the camera.

Example Programming Commands:
  To take a still picture, using SSH from a remote computer execute the script "raspistill -o example.jpg" to take a full frame Jpeg formatted still image and store it on the SD memory card as 'example.jpg'.
  To take a video, using SSH from a remote computer, execute the script "raspivid -o example.h264 -t 10000" to create a 10 second long h264 formatted vide0 and store it on the SD memory card.
  To initiate live streaming video, execute the script "raspivid -o - -t 0 -n -w 600 -h 400 -fps 12 | cvlc -vvv stream:///dev/stdin --sout '#rtp{sdp=rtsp://:8554/}':demux=h264" over SSH.
  Alternatively, camera control commands including live streaming implementation may be included in a stored computer program on the Raspberry Pi SD memory card such as raspiVidController.py and executed by using SSH and entering "python raspiVidController.py" from a remote computer.
  Alternatively, programming commands such as raspivid.py can be stored on the SD memory card and executed at startup by the computer controller as another way of executing programmed code.

The resultant still pictures and/or movies stored on the SD card that is connected to the Raspberry Pi may be transmitted to a remote computer over WiFi using operating system (such as Linux) commands. Streaming video is transmitted directly to the internet or intranet.

The memory contents on the Raspberry Pi can also be controlled, such as deleting the photographs after transmission to the remote computer, by executing standard Linux commands over SSH from a remote computer.

Live streaming video via VLC is streamed to the Internet on a particular communications port and specified format. The port that is used by VLC server for streaming can be selected during setup. The default port is 8554. The following discussion of viewing assumes that the default VLC port was enabled during streaming initiation. For example, by executing the script "raspivid -o - -t 0 -n -w 300 -h 200 -fps 12 | cvlc -vvv stream:///dev/stdin --sout '#rtp{sdp=rtsp://:8554/}':demux=h264:", the computer will produce a 300 pixel wide×200 pixel high streaming video using the specified protocol 'asp' formatted per h264, and transmit it over specified port '8554'. (To alternatively create a live stream using HTTP protocol and h264 format, the live stream would be initiated by executing the command ""raspivid -o - -t 0 -n -w 300 -h 200 -fps 12 | cvlc -vvv stream:///dev/stdin --sout '#rtp{sdp=http://:8554/}':demux=h264) The compatible viewer in a remote computer must also specify port '8554' when connecting to the live video feed. (If a different port was enabled during setup then the viewing options would have to select that different port. Similarly, if a different protocol such as http were specified instead of rtsp, then the viewer would have to specify protocol 'http' to view the video.) Alternatively, web server software (such as Flask) may be implemented on the Raspberry Pi, and used to host the bird feeder video images and/or streaming video so that the remote user can access the images or video stream by using standard web browsers (such as Google Chrome, Mozilla Firefox, or others).

To view the streaming video in the preferred implementation, VLC viewer is installed at a remote location (http://www.videolan.org/doc/vlc-user-guide/en/ch01.html). While running VLC, the user selects the streaming video option and enters the IP address and port of the VLC server (e.g., rtsp://192.168.0.190:8554/). The streaming video is then presented on the remote computer screen. Another step is required to also allow viewing over the world wide web via Internet. The additional required step required is to open the WiFi port allocated for the networked feeder producing the streaming video to the Internet by the WiFi router and redirect port 8554 to the bird feeder IP address. Assuming that the router IP address is 123.123.123.123, then the remote viewer would use a compatible viewer such as VLC and implement streaming video, by specifying the appropriate protocols and the router's IP address. If using RTSP protocol, the viewer would specify rtsp://123.123.123.123:8554/. (If alternatively using HTTP protocol for the live stream, the viewer would instead specify http://123.123.123.123:8554/ in the VLC instantiation.) Then the streaming video will appear, preferably over the internet on the remote computer screen, which is not then required to be connected to the same local network as the feeder producing the video. VLC viewer is (and alternative web browsers that support viewing images are) available for all major operating systems, including Windows, OS X, Linux, IOS and Android, so the streaming video can be viewed on mobile platforms such as iPhone as well as laptop and desktop computers. (Alternatively, observing world wide web conventions, the user could instead configure the WiFi router that hosts the feeder to redirect port 80 or port 8080 to the bird feeder while using a web server on the feeder to serve the images and/or streaming video to the internet. Internet viewers could then view the images using standard web browsers by connecting to the router IP address at designated port 80 or 8080.) A video stream can continue indefinitely, allowing viewers to monitor feeder activity.

Use of VLC for creating or viewing the live streaming video is not required. Many other programs can generate live streaming video in a variety of formats and communication protocols. It is required that the viewer and the live video use compatible (usually the same) protocols such as RTSP or HTTP, and be able to use the video format (e.g., h264 or mpeg) but many different applications including standard web browsers use these protocols and support the formats.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be included as falling within the scope of the invention.

What is claimed is:

1. A self-contained bird feeder configured to provide detailed images over a wireless network, comprising: a bird feeder with a built in camera, computer, and internet connection, the bird feeder comprising: a. a feeder housing; b. a feeder bottom; c. a feed port disposed on the feeder bottom; d. the camera internally mounted to the bird feeder such that the camera is aligned with the feed port to observe feeding birds; e. the computer located within the feeder housing; f. an internal power source; and g. a WiFi adapter located within the feeder housing.

2. The self-contained bird feeder of claim 1 wherein the WiFi adapter is a WiFi dongle.

3. The self-contained bird feeder of claim 1 further comprising a feed compartment disposed in the feeder housing and a feed compartment separator disposed in the feed compartment, whereby feed is fed by gravity from the feed compartment through the feeder housing, to the feeder bottom, and then to the feed port.

4. The self-contained bird feeder of claim 1 wherein the computer comprises: a processor; a display connector; a multi-media interface; an audio/video jack; and an ethernet socket.

5. The self-contained bird feeder of claim 1 wherein the computer comprises a micro USB socket and a USB port.

6. The self-contained bird feeder of claim 4 wherein the multi-media interface comprises an HDMI port.

* * * * *